United States Patent [19]
Klimpl

[11] 3,899,005
[45] Aug. 12, 1975

[54] MODULAR DUCT SYSTEM FOR ELONGATED FLEXIBLE MEMBERS SUCH AS TELEPHONE CABLE OR THE LIKE

[75] Inventor: Fred Klimpl, West Orange, N.J.

[73] Assignee: Fiberglass Resources Corporation, Farmingdale, N.Y.

[22] Filed: Aug. 6, 1973

[21] Appl. No.: 386,212

[52] U.S. Cl. ............. 138/106; 138/111; 248/68 CB
[51] Int. Cl.² .......................................... F16L 3/22
[58] Field of Search ........ 52/22; 138/106, 107, 111, 138/112; 248/56, 57, 68 R, 68 CB; 174/95, 96, 100

[56] References Cited
UNITED STATES PATENTS

| | | | |
|---|---|---|---|
| 257,357 | 5/1982 | McGrew | 285/137 |
| 618,837 | 2/1899 | Callaway | 174/95 |
| 751,443 | 2/1904 | Anthes | 248/57 |
| 1,806,176 | 5/1931 | Owens | 248/56 |
| 1,821,234 | 9/1931 | Parker | 138/112 |
| 1,959,633 | 5/1934 | Madden | 138/112 |
| 2,535,427 | 12/1950 | Kindorf | 248/68 |
| 2,661,483 | 12/1953 | Tortorice | 248/57 |
| 2,737,204 | 3/1956 | Bonte | 248/68 |
| 2,867,681 | 1/1959 | Huehnel | 248/68 |
| 3,437,297 | 4/1969 | Jirka et al. | 138/106 |
| 3,521,051 | 7/1970 | Wullschleger et al. | 248/56 |
| 3,526,934 | 9/1970 | Owen | 138/111 |

*Primary Examiner*—Herbert Goldstein
*Attorney, Agent, or Firm*—Leonard H. King

[57] ABSTRACT

A modular duct system for flexible, elongated articles such as telephone cables or the like is formed by a plurality of conduits that are axially telescoped in an end to end, colinear relationship and arranged in a side-by-side, rigid bundle. The conduits are preferably formed of translucent, resin bonded, glass fibers and which extend from floor to floor within a spaced formed in a vertical wall of a multi-story building. Means are provided for tapping off selected cables or the like, at various floor levels.

The aforementioned Abstract is neither intended to define the invention of the application which, of course, is measured by the claims, nor is it intended to be limiting as to the scope of the invention in any way.

5 Claims, 8 Drawing Figures

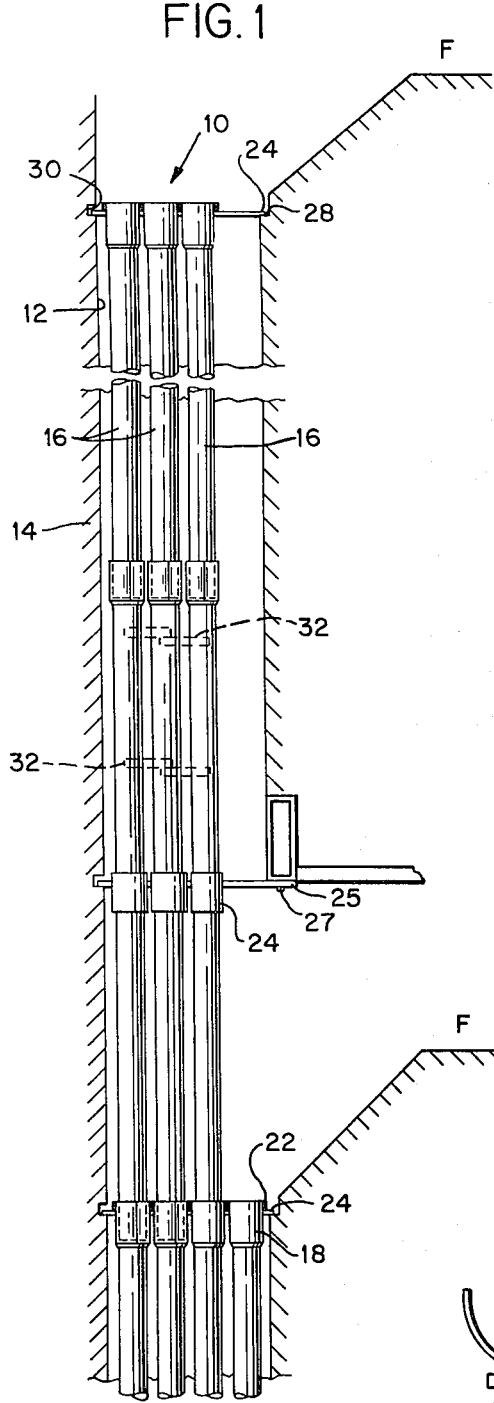
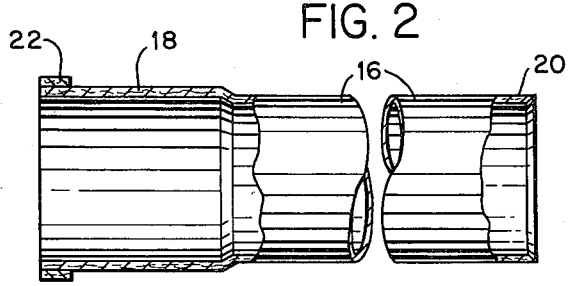
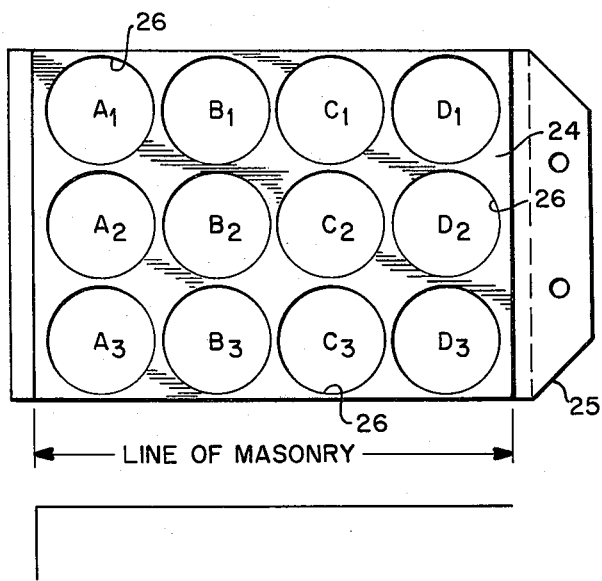
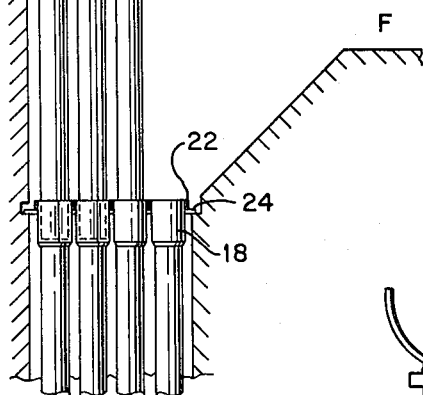
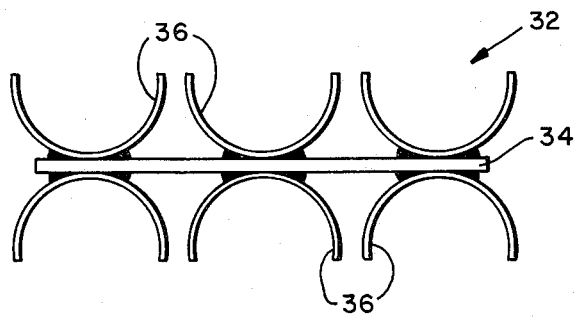

PATENTED AUG 12 1975 3,899,005

SHEET 2

3,899,005

MODULAR DUCT SYSTEM FOR ELONGATED FLEXIBLE MEMBERS SUCH AS TELEPHONE CABLE OR THE LIKE

BACKGROUND OF THE INVENTION

1. Field of the Invention

This invention relates generally to elongated conduits and more particularly to conduits through which elongated flexible members are threaded.

2. Description of the Prior Art

It is frequently necessary, particularly in a multi-story building, such as a telephone exchange, to thread cables or the like from floor to floor. Normally this is done in a space formed within one of the vertical walls. At each floor level it is often necessary to selectively draw out or tap one or more of the cables. In the prior art there was a major problem with the excessive weight of the conduits heretofore used. In addition the labor cost for installation was relatively high. Prior to the introduction of the present invention, it was very difficult to manipulate the long, heavy conduit sections and this increased the cost of the system.

SUMMARY OF THE INVENTION

The present invention overcomes the objections to and difficulties with the prior art structure by providing a light weight, resin bonded glass fiber of conduits in a rigid, compact bundle that is easily manipulated within the narrow confines of the building and which may readily be assembled at the building site. Because of the nature of the material used in the present invention on-the-site fitting of the individual lengths of conduit as well as the assembly thereof is feasible. Specifically, the present invention provides a modular duct system that includes a bundle of resin bonded glass fiber conduits that are arranged in a side-by-side array and maintained in that position by means of axially spaced apart clips. The conduits are coupled to each other in an end to end relationship by means of a telescoping fit. A perforated plate having openings therein that are arrayed in the same configuration as the conduits provide means for supporting the duct assembly in an opening formed in a vertical wall of a multi-story building. Because of the resin bonded glass fiber material used a thin walled duct is possible thus permitting a maximum number of ducts within a minimum opening in the wall. It will be appreciated that because of the material used there will be a major reduction in weight over the material used in the prior art. Once again, because of the material used in fabricating the conduits, it is possible and in fact it is preferable that the conduits be translucent thus enabling a cable installer to see at a glance which conduits are in use and which are not.

Accordingly, it is an object of the present invention to provide an improved modular duct system for use within a vertical wall in a multi-story building.

It is another object of the present invention to provide a modular duct system, as described above, that is light in weight low in cost and relatively simple to install.

A particular object of the present invention is to provide an improved modular duct assembly, as described above, wherein at least one of the conduits is split for facilitating tapping off of the cable running therethrough.

A feature of the present invention is that the conduits used may if desired be translucent.

These and other objects, feature and advantages of the invention, will, in part, be pointed out with particularity, and will, in part, become obvious from the following more detailed description of the invention, taken in conjunction with the accompanying drawings which form integral part thereof.

BRIEF DESCRIPTION OF THE DRAWING

In the various figures of the drawing like reference characters designate like parts.

In the drawing:

FIG. 1 is a fragmentary, elevational view schematically illustrating the modular duct assembly comprising the present invention installed in a multi-story building;

FIG. 2 is a longitudinal, sectional view illustrating a typical conduit comprising the present invention;

FIG. 3 is a plan view illustrating a support plate that may be used with the present invention;

FIG. 4 is a plan view illustrating a clip that may be used with the present invention;

DESCRIPTION OF THE PREFERRED EMBODIMENT

Figure 5:
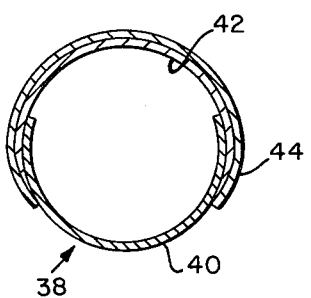
FIG. 5 is a sectional plan view illustrating an alternative form of construction for one or more of the conduits.

The modular duct system 10 comprising the present invention is adapted to be installed within an opening 12 formed within a vertical wall 14 or a multi-story building having a plurality of floor levels $f$. As shown for example in FIG. 2, each conduit 16 is provided with a bell 18 at one end thereof and a spigot 20 at the other end thereof. An annular lip 22 is formed integrally with the conduit 16 at the bell end 18. In the preferred embodiment of the present invention the wall of the duct 16 is made of resin bonded glass fibers that may be helically wound using conventional technique and apparatus. Preferably, the wall of the conduit 16 is translucent. In one embodiment of the present invention the conduit has a wall thickness of approximately one-sixteenth of an inch and an inside diameter at the spigot end 20 of approximately 3.90 inches. The inside diameter at the bell end 18 is approximately 4.06 inches while the outside diameter of the lip 22 is approximately 4.50 inches. The bell 18 has an axial length of approximately 5 inches while the lip 22 has an axial length of approximately 1 inch. In the assembled condition the spigot 20 of one conduit 16 is telescoped within the bell 18 of the next axially adjacent conduit 18. The telescoped joint defined by the bell 18 of one conduit 16 and the spigot 20 of the next axially adjacent conduit 16 is adhesively bonded for trouble free and leak proof field installation without special tools or skills.

In order to align the conduits 16 into a specific array and in order to support the array of conduits 16 within the shaft opening 12 in the wall 14 of the building, a support plate 24 such as shown in FIG. 3 may be utilized. The support plate 24 is provided by way of example, in the embodiment illustrated, with 12 openings 26 therethrough with three of the openings 26 being aligned in one direction and four of the openings 26 being aligned in a direction perpendicular to the first direction.

Figure 6:
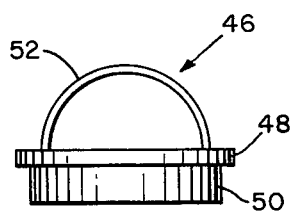
FIG. 6 is an elevational view illustrating a plug that may be used with the present invention.

For purposes of orientation the openings 26 in the first direction are labeled A1, A2, A3 etc. while the openings 26 in the second direction are labeled A1, B1, C1 and D1. The plates 24 rest on a lip 28 and within a notch 30 that are formed in the masonry wall 14 of shaft 12 as shown in FIG. 1. The plate 24 may be provided with an extension 25 which permits attachment to the building structure by bolts 27. In order to retain the conduits 16 in proper alignment a clip generally designated by the reference character 32 and which is shown in FIG. 4 may be utilized. The clip 32 is comprised of a plate 34 to which is adhesively secured at least two semi-circular segments 36. Preferably there are six or eight of the semi-circular segments 36 which are arranged back to back as shown in FIG. 4. Each of the clips 32 extend in the first direction, for example between the openings 26 labeled A and B, between the openings 26 labeled B and C, and between the openings 26 labeled C and D.

Where it is necessary to tap off the cable, such as between floors F, it is preferred to use a split conduit 38 such as shown in FIG. 5. The split conduit 38 is comprised of a first arcuate, inner segment 40 and outer, arcuate segment 42 that overlaps inner segment 40. An arcuate cover 44 is also provided and overlaps both the inner and outer arcuate segments 40 and 42. It will be appreciated that both the cover 44 and the outer arcuate segment 42 may be readily moved to permit access to the interior of the conduit 38 so that an elongated arcuate member, such as a telephone cable, can be tapped off. There is shown in FIG. 6 a plug 46 that may be used to seal the upper end of any of the conduits 16. The plug 46 is comprised of a disc 48 from which depends a cylindrical section 50 having an outside diameter that is slightly less than the inside diameter of the bell 18. A ring 52 is secured to the upper surface of the disc 48 so that the plug may be removed or inserted with ease.

Figure 7:
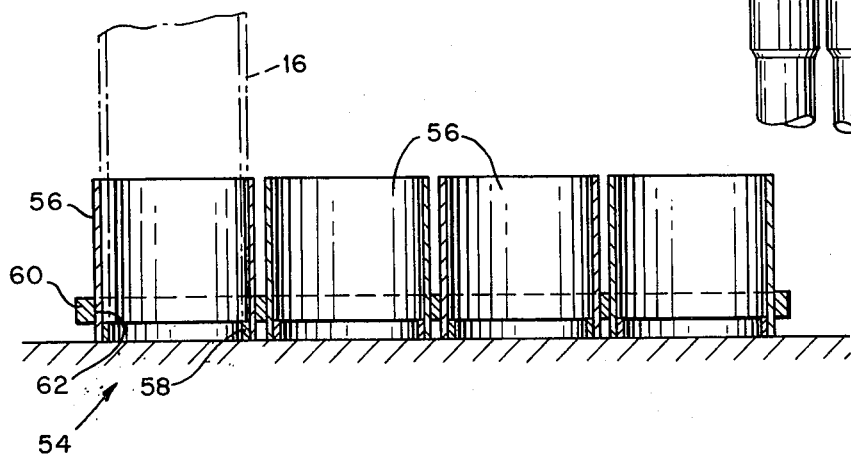
FIG. 7 is a sectional elevational view illustrating a starter plate that may be used with the present invention.

A starter plate 54 that may be used at the lower-most end of the modular duct assembly 10 is shown in FIG. 7. The starter plate 54 is comprised of a plurality of tubes 56 that are equal in number and in the same arrayed location as the bundle of ducts 16 described herinbefore. The inside diameter of each of the tubes 56 is the same as or perhaps slightly larger than the outside diameter of the spigot 20 of each duct 16. At the lower end of each tube 56 there is provided a ring 58 that acts as a stop for the lower end of the spigot 20 when the spigot 20 is positioned within the tube 56. A plate 60 having a plurality of openings 62 therethrough is used for receiving and aligning the tubes 56.

Figure 8:
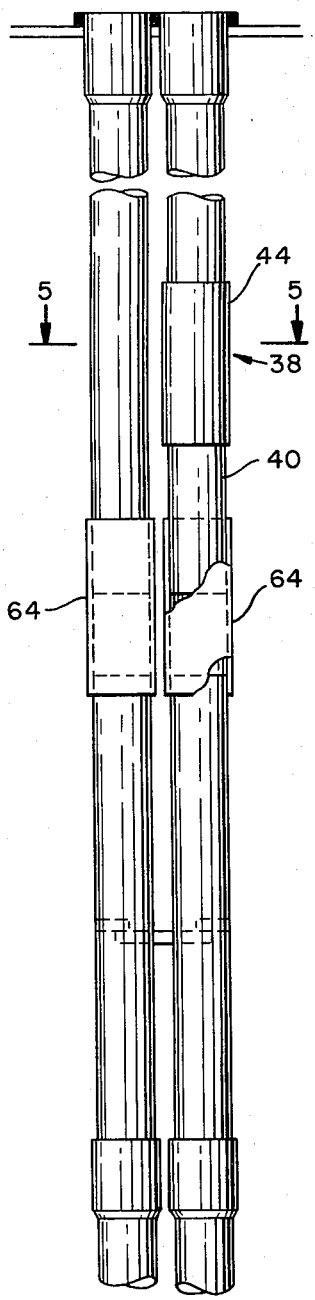
FIG. 8 is a schematic, elevational view illustrating another feature of the present invention.

An alternative embodiment of the present invention is shown in FIG. 8. In the alternative embodiment tubular, sleevelike spacer means 64 are used to couple axially adjacent ones of the conduits 16. Another advantage is that the non-magnetic, non-metallic properties of the conduit minimizes signal noise of interference with telecommunications signals. As a power cable duct no shorting out or hysterisis effects result such as occurs with metal duct systems.

From the foregoing it will be evident that an improved modular duct system for feeding and supporting elongated articles such as telephone cables, power cables or the like has been provided. The individual conduits are retained and supported in a side-by-side array and in telescoping end to end relationship. The conduits preferably are made of resin bonded, filament wound glass fibers that are durable, light weight, economical and which have high strength to weight ratios. The conduits comprising the present invention offer the advantage of being made from a translucent material that permits a rapid, visual inspection to determine whether the conduits are actually in use. The duct system comprising the present invention is stable and rigid over a wide temperature range, for example, from 65°F to +210°F and this characteristic allows a greater support spacing for example up to 16½ feet on a typical 21 foot length of 4 inch diameter conduit so that the initial cost of the supports and the cost of labor involved in installing the supports is reduced. A standard 21 foot conduit section having a 4 inch diameter weighs less than 17 pounds thus making it easier to handle and install without the need for heavy, expensive lifting equipment. Each of the conduits includes an integral bell at one end and spigot at the other end so that the end to end conduits may adhesively be bonded when the spigot of one conduit is telescoped into the bell of the next adjacent conduit. The material used with the present invention provides high impact resistance and thus there is less on the job breakage and a longer, more trouble free life. The modular duct system of this invention is immune to most corrosive chemicals, salt, bacteria and weather conditions and is easily cut to size on the job site using only a regular hack saw or a circular saw.

There has been disclosed hertofore the best embodiment of the invention presently contemplated. However, it is to be understood that various changes and modifications may be made thereto without departing from the spirit of the invention.

What I claim as new and desire to secure by Letters Patent is:

1. A modular duct system for feeding elongated articles such as telephone cables or the like within a vertical wall and between floors of a multi-story building, said duct system comprising;
   a. a plurality of groups of resin bonded, filament wound glass fiber, tubular conduits with the conduits in each said group being arranged in a side-by-side array that defines a rectangular pattern in a plane transverse the longitudinal axes of said conduits and with said groups of conduits being arranged in a generally end-to-end relationship;
   b. clip means for retaining said conduits of each said group in said array to thereby define a rigid bundle, said clip means comprising a first central plate having two pluralities of back-to-back and side-by-side arcuate segments integral therewith, each of said segments being arranged to engage a portion of the outside surface of one of said conduits;
   c. means for coupling selected ones of said conduits in each said group in end-to-end, colinear relationship whereby the articles may be passed through a plurality of said selected conduits;
   d. external, ring-shaped support means integral with said conduits for supporting said rigid bundles within the vertical wall of the building; and
   e. second plate means having a plurality of apertures therethrough for receiving said conduits, said apertures being arranged in the same pattern as said array of conduits, said ring-shaped support means being in engagement with said second plate means whereby, when said second plate means is mounted on an abutment that is part of a building and is supported thereby, said conduits will be disposed along substantially vertical axes.

2. The modular duct system in accordance with claim 1 wherein said conduits are translucent.

3. The modular duct system in accordance with claim 1 wherein said coupling means further comprises a tubular sleeve arranged to receive a spigot at each end thereof for permitting limited axial movement of two colinear, adjacent conduits.

4. The modular duct conduit system in accordance with claim 1 wherein there is further provided an end plug positioned in selected ones of said conduits.

5. A modular duct system for feeding elongated articles such as telephone cables or the like within a vertical wall and between floors of a multi-story building, said duct system comprising:

a. a plurality of groups of tubular conduits with the conduits in each said group being arranged in a side-by-side array and with said groups of conduits being arranged in a generally end-to-end relationship;

b. clip means for retaining said conduits of each said group in said array to thereby define a rigid bundle, said clip means including a first plate having at least one plurality of side-by-side arcuate segments integral therewith, each of said segments being arranged to engage a portion of the outside surface of one of said conduits;

c. means for coupling selected ones of said conduits in each said group in end-to-end, colinear relationship whereby the articles may be passed through a plurality of said selected conduits;

d. external, ring-shaped support means integral with said conduits for supporting said rigid bundles within the vertical wall of the building; and e. second plate means having a plurality of apertures therethrough for receiving said conduits, said apertures being arranged in the same pattern as said array of conduits, said ring-shaped support means being in engagement with said second plate means whereby, when said second plate means is mounted on an abutment that is part of a building and is supported thereby, said conduits will be disposed along substantially vertical axes, f. at least one of said conduits being split whereby access may be had to the interior of said split conduit without disassembling said duct system, said split conduit comprising an arcuate axially elongated inner segment, an arcuate axially elongated outer segment overlapping said inner segment and an arcuate, axially elongated cover overlapping both said inner and said outer segments.

* * * * *